(12) United States Patent
Leung et al.

(10) Patent No.: US 10,315,191 B2
(45) Date of Patent: Jun. 11, 2019

(54) PHOTOCATALYST

(71) Applicant: Hong Kong Polytechnic University, Kowloon, Hong Kong (CN)

(72) Inventors: Wallace Woon Fong Leung, Hong Kong (CN); Chun Pei, Hong Kong (CN)

(73) Assignee: Hong Kong Polytechnic University, Hung Hom, Kowloon (HK)

( * ) Notice: Subject to any disclaimer, the term of this patent is extended or adjusted under 35 U.S.C. 154(b) by 688 days.

(21) Appl. No.: 14/666,607

(22) Filed: Mar. 24, 2015

(65) Prior Publication Data

US 2015/0266013 A1 Sep. 24, 2015

Related U.S. Application Data

(60) Provisional application No. 61/969,260, filed on Mar. 24, 2014.

(51) Int. Cl.

| | |
|---|---|
| *B01J 35/00* | (2006.01) |
| *B01J 35/06* | (2006.01) |
| *B01J 21/06* | (2006.01) |
| *B01J 19/12* | (2006.01) |
| *B01D 53/88* | (2006.01) |
| *B01J 23/80* | (2006.01) |
| *B01J 27/057* | (2006.01) |

(52) U.S. Cl.
CPC .......... *B01J 35/004* (2013.01); *B01D 53/885* (2013.01); *B01J 19/123* (2013.01); *B01J 19/127* (2013.01); *B01J 21/063* (2013.01); *B01J 23/80* (2013.01); *B01J 35/0013* (2013.01); *B01J 35/06* (2013.01); *B01D 2255/2096* (2013.01); *B01D 2255/20707* (2013.01); *B01D 2255/20792* (2013.01); *B01D 2255/802* (2013.01); *B01D 2255/90* (2013.01); *B01D 2255/9202* (2013.01); *B01D 2257/404* (2013.01); *B01D 2257/708* (2013.01); *B01D 2257/7027* (2013.01); *B01D 2259/802* (2013.01); *B01D 2259/804* (2013.01); *B01J 27/0576* (2013.01); *B01J 2219/0875* (2013.01); *B01J 2219/0877* (2013.01); *B01J 2231/005* (2013.01); *B01J 2531/002* (2013.01)

(58) Field of Classification Search
None
See application file for complete search history.

(56) References Cited

U.S. PATENT DOCUMENTS 5,862,449 A * 1/1999 Bischoff ................. C02F 1/325
422/186.3
7,449,101 B2 * 11/2008 Okamura ................ C23C 30/00
205/736

(Continued)

OTHER PUBLICATIONS

Richters et al, Influence of polymer coating on the low-temperature photoluminescence properties of ZnO nanowires, 2008, appl. phys. lett. 92 (Year: 2008).*

(Continued)

*Primary Examiner* — Melvin C. Mayes
*Assistant Examiner* — Stefanie J Cohen
(74) *Attorney, Agent, or Firm* — Leydig, Voit & Mayer

(57) ABSTRACT

A photocatalyst includes a composite fiber having at least two crystalline semi-conductors that provide a heterojunction structure in the composite fiber.

29 Claims, 16 Drawing Sheets

(56) References Cited

U.S. PATENT DOCUMENTS

| | | | | |
|---|---|---|---|---|
| 2002/0130311 | A1* | 9/2002 | Lieber | B01J 23/50 257/1 |
| 2007/0190880 | A1* | 8/2007 | Dubrow | B01D 39/08 442/181 |
| 2011/0192789 | A1* | 8/2011 | Gogotsi | D04H 1/4234 210/504 |
| 2011/0245576 | A1* | 10/2011 | Keller-Spitzer | A62D 5/00 588/309 |
| 2012/0267234 | A1* | 10/2012 | Reece | B01J 19/127 204/157.52 |

OTHER PUBLICATIONS

Barnham et al, low dimensional semiconductor structures: fundamentals and device applications, 4.2 (Year: 2008).*

DeMeo et al, Electrodeposited Copper Oxide and Zinc Oxide Core-Shell Nanowire Photovoltaic Cells, Nanowires—Implementations and Applications, 2011, http://www.intechopen.com/books/nanowires-implementations-and-applications/electrodeposited-copperoxide-and-zinc-oxide-core-shell-nanowire (Year: 2011).*

Li et al, a novel route to ZnO/TiO2 heterojunction composite fibers, Feb. 2013, journal of materials research, https://www.researchgate.net/publication/258797682 (Year: 2013).*

Zhang et al, Electrospun Nanofibers of p-Type NiO/n-Type ZnO Heterojunctions with Enhanced Photocatalytic Activity, 2010, applied materials and interfaces, http://pubs.acs.org/doi/pdf/10.1021/am100618h (Year: 2010).*

Li et al, preparation and photocatalytic properties of Bi2O3/TiO2 composite fibers, journal of inorganic materials, vol. 27, No. 7, pp. 687-692 (Year: 2012).*

Li et al, preparation and photocatalytic properties of Bi2O3/TiO2 composite fibers, journal of inorganic materials, vol. 27, No. 7, pp. 687-692, english translation (Year: 2012).*

Subrmanian et al, facile fabrication of heterostructured bi2o3-zno photocatalyst and its enhanced photocatalytic activity, journal of physical chemistry,116, 26306-26312 (Year: 2012).*

Yang et al, electrospun zno/bi2o3 nanofibers with enhanced photocatalytic activity, journal of nanomaterials, vol. 2014, Mar. 3, 2014 (Year: 2014).*

Jing et al.; "Effects of Surface oxygen Vacancies on Photophysical and Photochemical Processes of Zn-Doped $TiO_2$ Nanoparticles and Their Relationships", *J. Phys. Chem. B, 110*, pp. 17860-17865, (Aug. 23, 2006).

Zhu et al.; "Fe-doped $TiO_2$ Nnanotube Array Films for Photocathodic Protection of Stainless Steel", *ECS Transactions*, 53 (33), pp. 31-39, (2013).

Wang et al.; "A comparative study of nanometer sized Fe(III)-doped $TiO_2$ photocatalysts: synthesis, characterization and activity", *J. Mater. Chem., 13*, pp. 2322-2329, (Jul. 24, 2003).

Štengl et al.; Preparation and photocatalytic activity of rare earth doped $TiO_2$ nanoparticles, *Materials Chemistry and Physics 144*, pp. 217-226, (2009).

Chen et al.; "Carbon and Nitrogen Co-doped $TiO_2$ with Enhanced Visible-Light Photocatalytic Activity", *Ind. Eng. Chen. Res. 46*, pp. 2741-2746, (Mar. 31, 2007).

Sathish et al.; "Synthesis Characterization, Electronic Structure, and Photocatalytic Activity of Nitrogen-Doped $TiO_2$ Nanocatalyst", *Chem. Mater. 17*, pp. 6349-6353, (Nov. 17, 2005).

Cong et al.; "Synthesis and Characterization of Nitrogen-Doped $TiO_2$ Nanophotocatalyst with High Visible Light Activity", *J. Phys. Chem., 111*, pp. 6976-6982, (Apr. 21, 2007).

Bakardjieva et al.; Photoactivity of anatase-rutile $TiO_2$ nanocrystalline mixtures obtained by heat treatment of homogeneously precipitated anatase, *Applied Catalysis B: Environmental 58*, pp. 193-202, (Jan. 15, 2005).

Kandiel et al.; Brookite versus anatase $TiO_2$ photocatalysts: phase transformations and photocatalytic activities, *Photochem. Photobiol. Sci. 12*, pp. 602-609, (2013).

Tsukamoto et al.; Gold Nanoparticles Located at the Interface of Anatase/Rutile $TiO_2$ Particles as Active Plasmonic Photocatalysts for Aerobic Oxidation, *J. American Chem. Soc.*, pp. 6309-6315, (Mar. 22, 2012).

Chorfi et al.; "$TiO_2$—ITO and $TiO_2$—ZnO nanocomposites: application on water treatment", *EPJ Web of Conferences 29*, pp. 00015-p. 1-7, Pub. By EDP Sciences (2012).

Wei et al.; Preparation and characterization of p-n heterojunction photocatalyst p-$CuBi_2O_4$/n-$TiO_2$ with high photocatalytic activity under visible and UV light irradiation, *J. Nanopart Res.12*, pp. 1355-1366 (Jun. 16, 2009).

Liu et al.; "An Efficient Bicomponent $TiO_2/SnO_2$ Nanofiber Photocatalyst Fabricated by Electrospinning with a Side-by-Side Dual Spinneret Method", *Nano Letters*, vol. 7, No. 4, pp. 1081-1085, (Sep. 29, 2006).

Yang et al.; "Improvement in light harvesting in a dye sensitized solar cell based on cascade charge transfer", *Nanoscale, 5*, pp. 7493-7498 (2013).

Cant et al.; "Tailoring the conduction band of titanium oxide by doping tungsten for efficient electron injection in a sensitized photoanode", *Nanoscale, 6*, pp. 3875-3880, (2014).

Bian et al.; "Self-Assembly of Active $Bi_2O_3/TiO_2$ Visible Photocatalyst with Ordered Mesoporous Structure and Highly Crystallized Anatase", *J. Phys. Chem. 112*, pp. 6258-6262 (Mar. 28, 2008).

Zhao et al.; "UV-visible-light-activated photocatalysts based on $Bi_2O_3/Bi_4Ti_3O_{12}/TiO_2$ double-heterostructured $TiO_2$ nanobelts", *j. Mater. Chem., 22*, pp. 23395-23403, (2012).

Balachandran et al.; "Facile Fabrication of Heterostructured $Bi_2O_3$—ZnO Photocatalyst and Its Enhanced Photocatalytic Activity", *J. Phys. Chem., 116*, pp. 26306-26312, (Nov. 29, 2012).

Pei et al.; "Enhanced photocatalytic activity of electrospun $TiO_2$/Zn) nanofibers with optimal anatase/rutile ratio", *Catalysis Communications 37*, pp. 100-104, (Apr. 2, 2013).

Yashima et al.; "Temperature Dependence of Lattice Parameters and Anisotropic Thermal Expansion of Bismuth Oxide", *J. Am. Ceram. Soc. 88 [8]*, pp. 2332-2335, (2005).

Madhavan et al.; "Electrospun continuous nanofibers based on a $TiO_2$—ZnO-graphene composite", *RSC Adv., 3*, pp. 25312-25316, (2013).

Lommens et al.; "Synthesis and thermal expansion properties of $ZrO_2/ZrW_2O_8$ composites", *J. of the European Ceramic Society*, pp. 1-6, (2004).

Du et al.; "Optimization of electrospun $TiO_2$ nanofibers photoanode film for dye-sensitized solar cells through interfacial pre-treatment, controllable calcinations, and surface post-treatment", *Surf. Interface Anal., 45*, pp. 1878-1883, (Oct. 9, 2013).

Hu et al.; "Visible-Light-Induced Photocatalytic Degradation of Azodyes in Aqueous AgI/ $TiO_2$ Dispersion", *Environ. Sci. Technol.*, vol. 40, No. 24, pp. 7903-7907, (2006).

Xiang et al.; "Synergetic Effect of $MoS_2$ and Graphene as Cocatalysts for Enhanced Photocatalytic $H_2$ Production Activity of $TiO_2$ Nanoparticles", *J. Am. Chem. Soc., 134*, pp. 6575-6578, (Mar. 29, 2012).

Bai et al.; "Effect of Zn and Ti mole ratio on microstructure and photocatalytic properties of magnetron sputtered $TiO_2$—ZnO heterogeneous composite film", *Trans. Nonferrous Met. Soc. China 23*, pp. 3643-3649, 2013).

Ren et al.; "Degradation of benzene on $TiO_2/SiO_2/Bi_2O_3$ photocatalysts under UV and visible light", *J. Molecular Catalysis A: Chemical 398*, pp. 215-222, (Dec. 10, 2014).

Adachi et al., "Comparison of Electrochemical Impedance Spectroscopy between Illumination and Dark Conditions", *Chem. Lett., 40*, pp. 890-892, (Jul. 27, 2011).

Hao et al.; "Molecular Design to Improve the Performance of Donor-ñ Acceptor Near-IR Organic Dye-Sensitized Solar Cells", *ChemSusChem, 4*, pp. 1601-1605, (2011).

Tsao et al.; "Influence of the interfacial charge-transfer resistance at the counter electrode in dye-sensitized solar cells employing cobalt redox shuttles", *Energy Environ. Sci., 4*, pp. 4921-4924, (2011).

* cited by examiner

PHOTOCATALYST

TECHNICAL FILED

This invention relates to a photocatalyst, although not exclusively, to a photocatalyst comprising a composite fiber and the composite fiber includes at least two crystalline semi-conductors.

BACKGROUND

Tremendous efforts have been put into developing highly effective photocatalysts for pollution abatement. As for the most studied photocatalyst, titanium dioxide suffers from low sun light responsiveness (solar irradiation consisting of respectively, approximately 5% ultra-violet light, 43% visible light, and 52% harvestable infrared light); which defers its use for otherwise much wider industrial applications. The low sunlight responsiveness of $TiO_2$ is mainly because of its large band gap which can only be activated by UV light. Accordingly, effort is required to modify $TiO_2$ so as to enhance its catalytic efficiency.

$TiO_2$ is commercially available in a form of nanoparticle which is considered to have large surface-to-volume ratio for enhancing catalytic performance. However, due to the small size of nanoparticle, it may be readily detached from a surface and inhaled by users who come across with the nanoparticle. The detachment of nanoparticles may raise health and environment concerns especially when the nanoparticles are positioned adjacent to an air stream or liquid stream. Therefore, even if a photocatalyst such as $TiO_2$ is fabricated as nanoparticles, it may still have the above problems.

SUMMARY OF THE INVENTION

According to a first aspect of the present invention, there is provided a photocatalyst comprising a composite fiber having at least two crystalline semi-conductors, wherein the crystalline semi-conductors provide a heterojunction structure in the composite fiber.

In one embodiment of the first aspect, the crystalline semi-conductors have suitable band position alignments, which allow the vectorial displacement of electrons and holes.

In one embodiment of the first aspect, the crystalline semi-conductor is a n-type semi-conductor selected from titanium dioxide, bismuth oxide, zinc oxide or any combination thereof.

In one embodiment of the first aspect, the crystalline semi-conductor is a p-type semi-conductor selected form copper (I) oxide, copper (II) oxide, cadmium telluride or any combination thereof.

In one embodiment of the first aspect, the crystalline semi-conductor comprises bismuth oxide with a concentration of around 0.1% to 1%, zinc oxide with a concentration of around 0.1% to 1%, and titanium dioxide with a concentration of around 1% to 10% in a precursor solution when preparing the composite fibers.

In one embodiment of the first aspect, the composite fiber has a nanostructure.

In one embodiment of the first aspect, the photocatalyst of this invention is capable for removing a contaminant in a stream of gas or liquid, wherein the contaminant comprises a pollutant.

In a further embodiment of the first aspect, the composite fiber of the photocatalyst comprises a polymer coating.

In a further embodiment of the first aspect, the photocatalyst comprises a substrate for holding the composite fiber. Preferably, the substrate is transparent to light and is permeable to gas. Preferably, the substrate is flexible. Preferably, the substrate is a network with nanostructure and the network nanostructure consists of polymeric fibers. The polymeric fiber is nylon. Preferably, the composite fiber held in the substrate is in a form of nanofibers, truncated nanofibers, nanowires, nanorods, or a combination thereof.

According to a second aspect of the present invention, there is provided a device for removing a contaminant from a stream of gas or liquid, comprising a photocatalyst having composite fiber having at least two crystalline semi-conductors, wherein the crystalline semi-conductors provide a heterojunction structure in the composite fiber.

In one embodiment of the second aspect, the photocatalyst is activated by ultra-violet light, visible light, or a combination thereof.

In one embodiment of the second aspect, a filter is provided upstream of the photocatalyst in the device.

In one embodiment of the second aspect, the photocatalyst has a pleated configuration. Preferably, the photocatalyst protrudes into the stream of gas or liquid from an internal wall of the device.

According to a third aspect of the present invention, there is provided a method for removing contaminant from a stream of gas or liquid, comprising steps of: placing a photocatalyst adjacent to the stream of gas or liquid; and providing a light source to activate the photocatalyst for photocatalytic reaction, wherein the photocatalyst has a composite fiber having at least two crystalline semi-conductors, the crystalline semi-conductors provide a heterojunction structure in the composite fiber.

In one embodiment of the third aspect, the photocatalyst is provided with a substrate holding the composite fiber therein.

In one embodiment of the third aspect, the photocatalyst is positioned substantially tangentially with respect to a direction of the stream of gas or liquid.

In one embodiment of the third aspect, the photocatalyst is positioned at an angle with respect to a direction of the stream of gas or liquid, and the stream of gas or liquid flows through the photocatalyst from an upstream end to a downstream end of the photocatalyst.

In one embodiment of the third aspect, the light source is selected from ultra-violet light, visible light, or a combination thereof.

In a further embodiment of the third aspect, the method further comprises a step of placing a filter upstream of the photocatalyst to remove suspended particles in the stream of gas or liquid.

BRIEF DESCRIPTION OF THE DRAWINGS

Embodiments of the present invention will now be described, by way of example, with reference to the accompanying drawings in which:

FIG. 1a shows a SEM of the composite nanofibers; FIG. 1b shows a TEM of the nanofibers; and FIG. 1c shows a TEM of the nanofibers in a high resolution.

FIGS. 14a, 14b, and 14c respectively show the nylon substrate having truncated TBZ nanofibers prepared from spraying, dip coating, and deep casting; and FIGS. 14d, 14e, and 14f respectively show close ups of FIGS. 14a, 14b, and 14c.

DETAILED DESCRIPTION OF THE PREFERRED EMBODIMENT

In one aspect of the present invention, there is provided a photocatalyst comprising a composite fiber. The composite fiber has at least two crystalline semi-conductors, wherein the crystalline semi-conductors provide a heterojunction structure in the composite fiber. In the following description, a number of embodiments of the photocatalyst and the method for preparing the photocatalyst are described.

In a photocatalytic process, photons from a light source are absorbed by the surface of the titanium dioxide, excited electrons and subsequent radicals are generated within the material. These radicals subsequently react with the pollutants, and degrade them to harmless products. In one embodiment of the present invention, the light source is selected from ultra-violet light, visible light or a combination thereof.

Figure 1A:
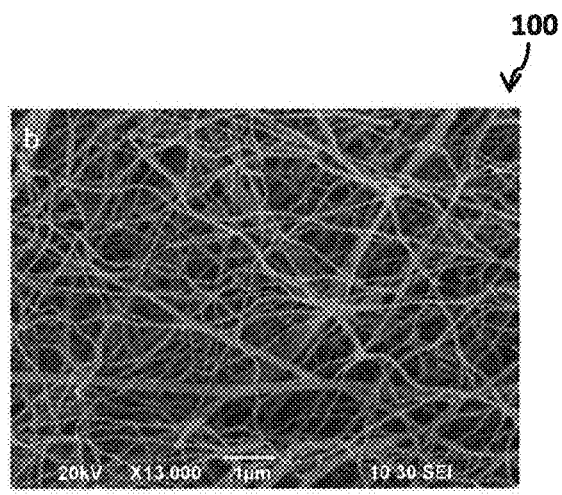
FIGS. 1a, 1b, and 1c show Transmission Electron Micrograph (TEM) and Scanning Electron Micrograph (SEM) of a photocatalyst comprising $TiO_2/ZnO/Bi_2O_3$ composite nanofibers (TZB nanofibers) after calcination.
Figure 1B:
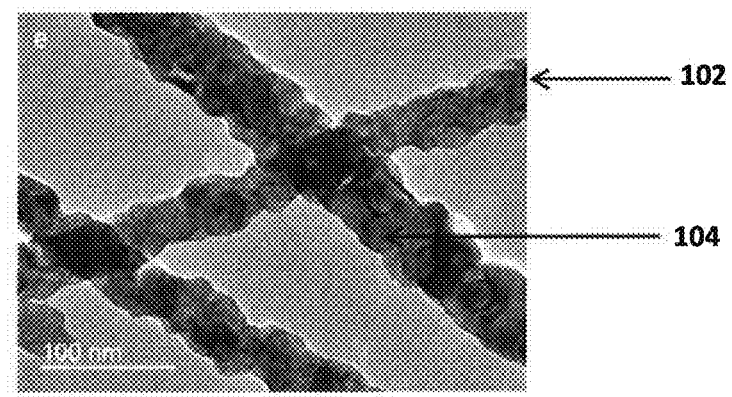
Figure 1C:
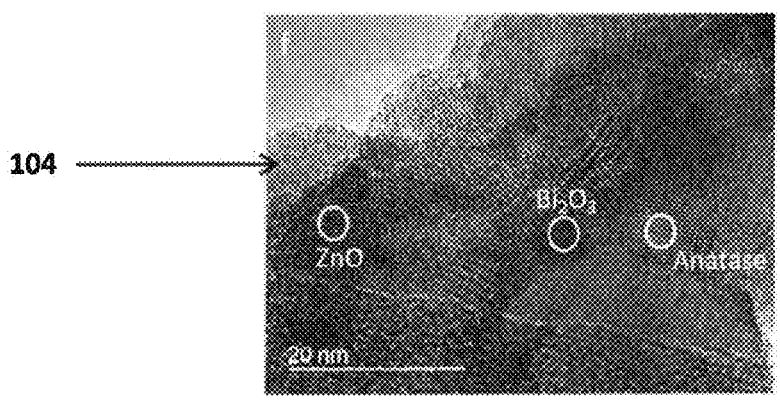

With reference to FIG. 1a to 1c, there is illustrated an embodiment of a photocatalyst of the present invention. In this embodiment, the photocatalyst 100 comprises a number of composite fibers 102. The composite fibers 102 are nanofibers having nanocrystallines 104 dispersed on the surface of the nanofibers 102. The nanocrystallines 104 provide substantially large surface-to-volume ratio for adhesion of targeted compound and facilitate photocatalytic process. Preferably, these nanocrystallines are semi-conductors having suitable band position alignments, which allow the vectorial displacement of charges (i.e. electrons and holes). In this embodiment, the semi-conductors are titanium dioxide ($TiO_2$), zinc oxide (ZnO) and bismuth oxide ($Bi_2O_3$).

These nanocrystalline semi-conductors are closely packed and provide heterojunction structure for enhancing the photogenerated electron/hole separation efficiency and the photocatalytic performance. The vectorial charge transfer from one semiconductor to another with suitable band edge positions that are thermodynamically favorable can promote the interfacial charge transfer and improve the catalytic efficiency. The other semi-conductors having suitable band position may also be applied in this invention. In this embodiment, the composite nanofiber 102 consists of $TiO_2$, ZnO and $Bi_2O_3$. These three semi-conductors provide a number of heterojunctions which facilitate the movement of the electrons and holes so as to narrow the band gap. Alternatively, the composite fiber of the present invention may adopt other combination of semi-conductors, for example, $TiO_2$/ZnO fibers, $TiO_2$/$Bi_2O_3$ fibers, or ZnO/$Bi_2O_3$ fibers. Other possible semi-conductor that can reduce the band-gap can also be used.

With reference to FIGS. 1a, 1b, and 1c, the structure of the nanocrystallines 104 improves the surface-to-volume ratio of the nanofibers 102 so as to provide large surface area for photocatalytic reaction. Preferably, the nanocrystalline 104 has a diameter of around 5 nm to 150 nm, and more preferably around 10 nm. The large surface area allows the nanocrystallines 104 to serve as an efficient receiver of photons during irradiation and the nanofiber serves as a highway for transferring charges. Moreover, when comparing with nanoparticle, nanofiber 102 having nanocrystallines 104 would have a larger surface area for photocatalytic reaction, and reduce the risk of inhaling the nano-material into the body as nanofiber has a large length-to-diameter ratio. Preferably, the composite nanofiber is around 50 nm to 1000 nm in diameter and can be extended up to meters in length. More preferably, the composite nanofibers have a diameter of 80 to 100 nm. With reference to FIGS. 1a, 1b, and 1c, the nanofibers 102 have a diameter of around 90 nm.

In a specific embodiment, the photocatalyst of FIGS. 1a, 1b, and 1c was fabricated based on a sol-gel assisted electrospinning method. Firstly, 3% (V/V) titanium tetraisopropoxide (TIIP) and isometric acetic acid were mixed with 4% (w/w) polyvinyl pyrrolidone (PVP) powders and ethanol. The mixture was under ultrasonication for 30 min. Subsequently, 0.1% zinc acetate dehydrate and a portion of bismuth (III) nitrate pentahydrate were added to the solution with sufficient mixing (under ultrasonication) for 6 h to obtain a homogeneous solution to be fed to the nozzle-less electrospinning device. A thin film of solution was conveyed out of the liquid pool by the rotating electrode. Under the electric field, a jet was produced from instability due to the surface tension at the liquid surface being overtaken by the electric field force acting between the positively charged rotating electrode and the ground collector. The fibers jetted into the air, and positive charges deposited on the fiber repelled against each other, and together with evaporation, the diameter of the fibers reduced continuously during the free flight of the fibers from the rotating electrode to the ground collector. The collected electrospun fibers were subsequently calcinated in a furnace with temperature ramping slowly to 650° C. (at heating rate of 1° C. $min^{-1}$). Under controlled evaporation, both organic compounds (e.g. ethanol, PVP) and residual water left in the nanofibers were slowly removed. Finally, the photocatalyst comprising the composite nanofibers is obtained. The nanofibers are packed with nanocrystallines of $TiO_2$, ZnO and $Bi_2O_3$. Similar approach can also be applied for fabricating other photocatalyst having similar composite fibers.

The morphologies of the composite nanofibers were studied by using scanning electron microscope with energy dispersive spectroscopy (SEM-EDS) (JEOL Model JSM-6490) and transmission electron microscopy (TEM) (JEOL Model JEM-2011). Phase analyses were carried out on X-ray diffraction (XRD) (Rigaku SmartLab) in the range of 20°-80° (2θ) at ambient condition. The UV-Vis diffuse reflectance spectra (DRS) were measured and recorded on a Varian Cary 100 Scan UV-Vis system equipped with a Labsphere diffuse reflectance accessory to obtain the reflectance spectra of the catalysts over a range of 200-800 nm. $BaSO_4$ (Labsphere USRS-99-010) was used as a reference in the measurement. The measured spectra were converted from reflection to absorbance by the Kubelka-Munk equation.

Figure 2:
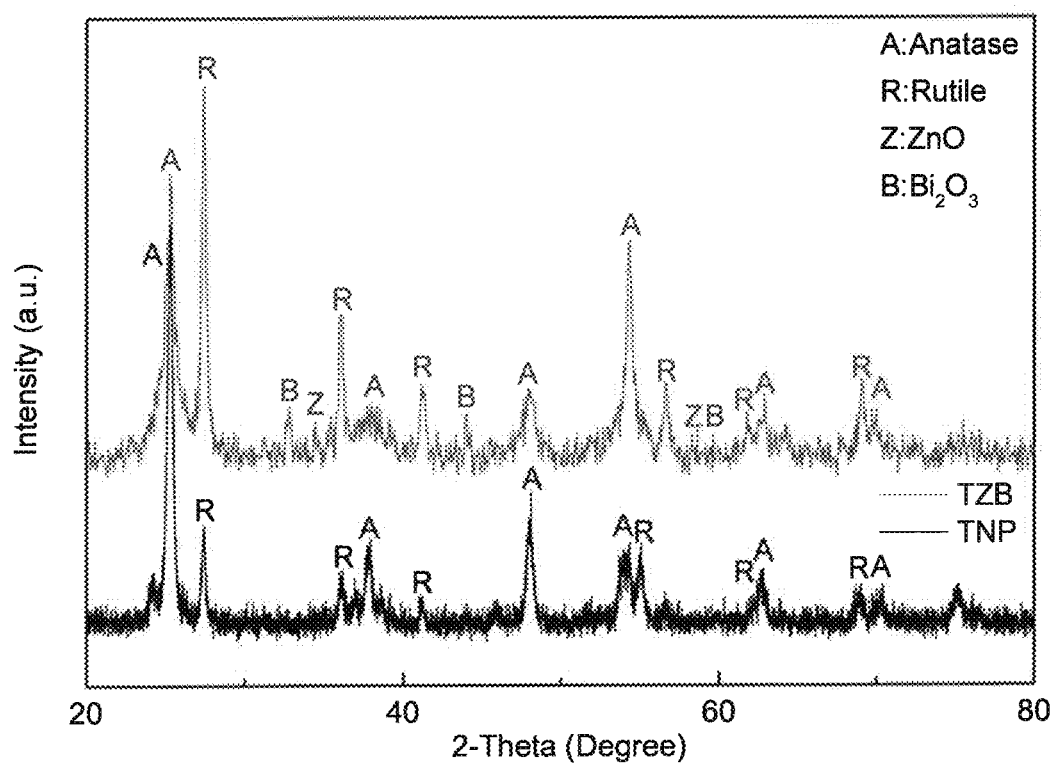
FIG. 2 shows X-ray diffraction (XRD) patterns of the TZB nanofibers and commercial $TiO_2$ nanoparticles.

FIG. 2 shows XRD patterns of the composite $TiO_2$/ZnO/$Bi_2O_3$ nanofibers (TZB nanofibers) of the present invention and commercial $TiO_2$ nanoparticles (TNP). It reveals the presence of anatase (JCPDS card No. 21-1272), rutile (JCPDS card No. 21-1276), zincite (JCPDS card No. 65-682) and bismuth oxide (JCPDS card No. 41-1449) in the TBZ nanofibers. Anatase and rutile are two mineral forms of $TiO_2$. Accordingly, the XRD pattern of the TZB nanofibers is consistent with the results shown in FIG. 1c.

FIG. 3 shows the absorption spectra of $TiO_2$/ZnO (TZ) nanofibers, $TiO_2$/$Bi_2O_3$ (TB) nanofibers, TZB nanofibers and commercial $TiO_2$ nanoparticles between 200 and 800 nm, the absorption edge of TZB nanofibers has been shifted to the visible region. Comparing the results of TZB nanofibers and commercial $TiO_2$ nanoparticles (P25), TZB nanofibers significantly improves the absorbance in the UV range, and also utilizes part of the visible range. Using the Kubelka-Munk equation, the band gap of TZB nanofibers and $TiO_2$ nanoparticles (P25) have been determined to be 2.51 eV and 3.12 eV, respectively. The decrease in band-gap energy of TZB nanofibers as compared to $TiO_2$ nanoparticles can be attributed to the synergistic effect among anatase, rutile, ZnO, and $Bi_2O_3$. Because of the synergetic effect among the conduction bands of these composites, some sub-bands are formed in the forbidden band of $TiO_2$ introducing impurities and defects thereby reducing the band-gap energy.

Figure 4:
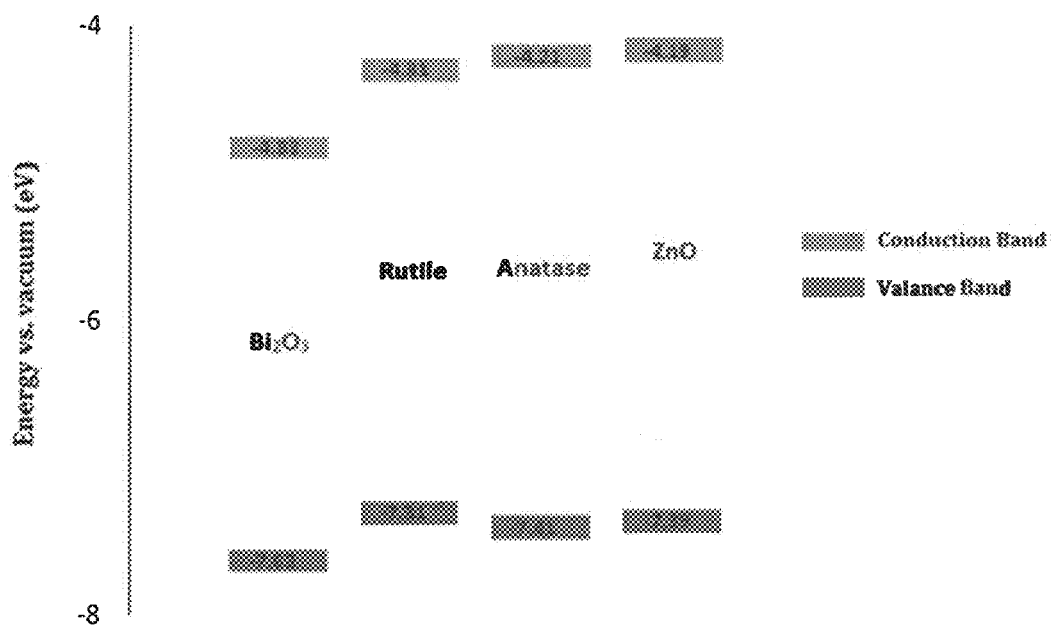
FIG. 4 shows an energy diagram of the TZB nanofibers.

With reference to FIG. 4, the TZB nanofibers have an interesting energy diagram. The band position alignment favors movement of electrons and holes, and leads to a lower band energy gap. The great charge separation resulted from the different energy positions also reduces the recombination rate of photogenerated electron/hole pairs. Accordingly, TZB nanofibers can effectively facilitate the generation of radicals with the water vapor in air or water molecules in liquid, producing both oxygen and hydroxyl radicals. The radicals produced can therefore react with the targeted compound, for example any contaminant in the air or liquid, to degrade or convert the compound into harmless substances.

In another embodiment, the composite nanofiber may comprise a combination of n-type and p-type semi-conductors. It is known that p-n heterojunction-type photocatalysts not only can expand semiconductor responding wavelength range though sensitization effect, but also restrain charge carrier recombination through the built-in electric field effect, thus greatly improve the photocatalytic performance of the material.

Figure 5:
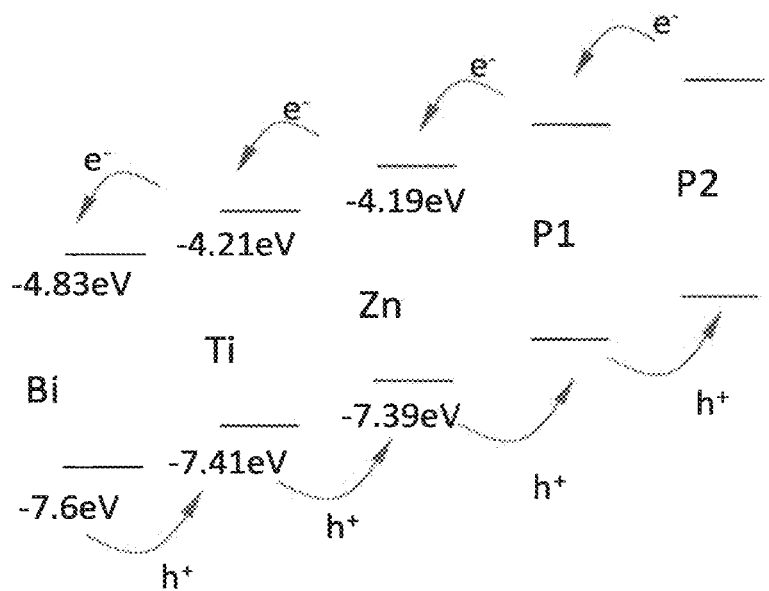
FIG. 5 shows a schematic diagram of the movement of electron and holes in the TZB-P1-P2 nanofibers.

Accordingly, n-type semiconductor such as titanium dioxide ($TiO_2$), zinc oxide (ZnO) and bismuth oxide ($Bi_2O_3$) mentioned above can be used together with p-type semiconductor such as copper (I) oxide CuO (1.2 eV), copper (II) oxide $Cu_2O$ (2.0 eV), and cadmium telluride CdTe (1.4 eV) to form the composite fiber of the present invention. As illustrated in FIG. 5, a first p-type semiconductor (P1) can be used with energy level higher than zinc oxide so that it can trigger transfer of electron to Zn and Zn to Ti, and from Ti to Bi. Vice versa, the holes are readily transferred from the n-type Zn to the p-type P1, which kicks off a series of hole transfer from Bi to Ti, and from Ti to Zn, and Zn to P1. Optionally, similar logic can call for having a second p-type semiconductor (P2), with energy level even higher than P1. This is advantageous in that the additional semiconductor such as a p-type semi-conductor, having proper energy level, further enhance the catalytic performance.

Figure 3A:
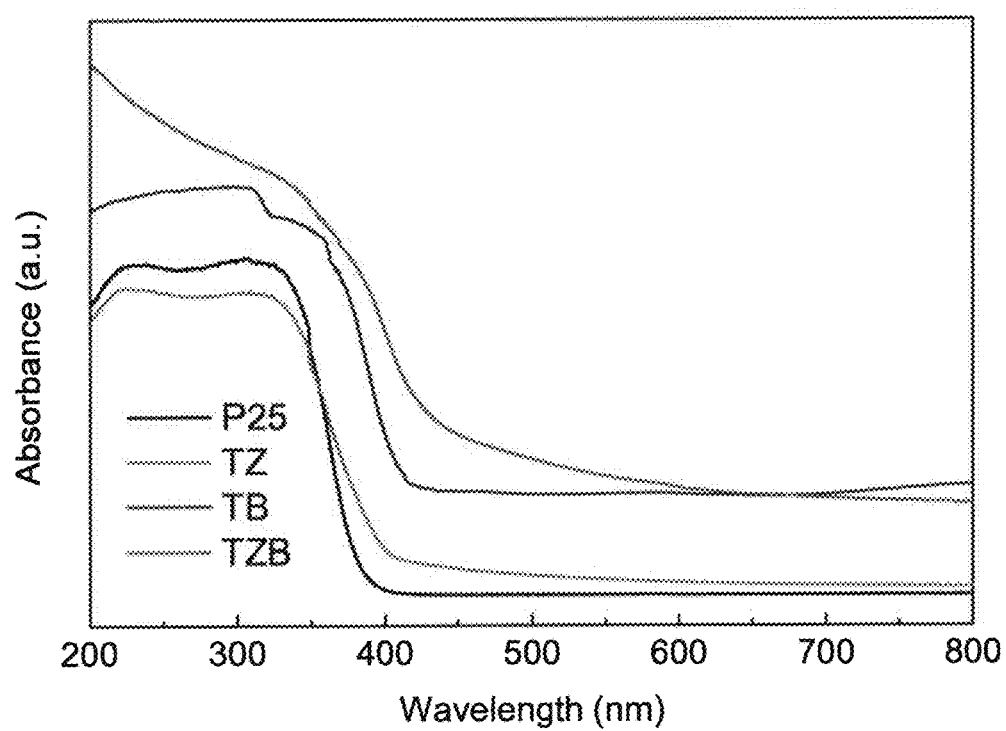
FIG. 3a shows UV-Vis absorption spectra of $TiO_2$/ZnO (TZ) nanofibers, $TiO_2$/$Bi_2O_3$ (TB) nanofibers, TZB nanofibers and commercial $TiO_2$ nanoparticles (P25) between 200 and 800 nm.
Figure 3B:
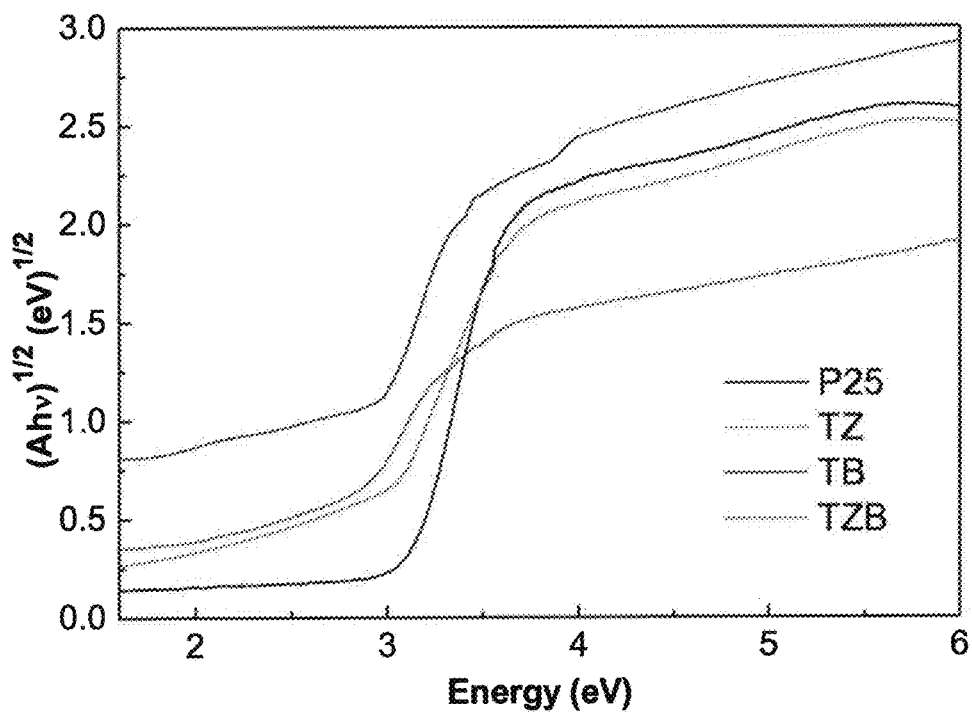
FIG. 3b shows the UV-Vis diffuse reflectance spectra of TZ, TB and TZB nanofibers, and commercial nanoparticles $TiO_2$ (P25).
Figure 6:
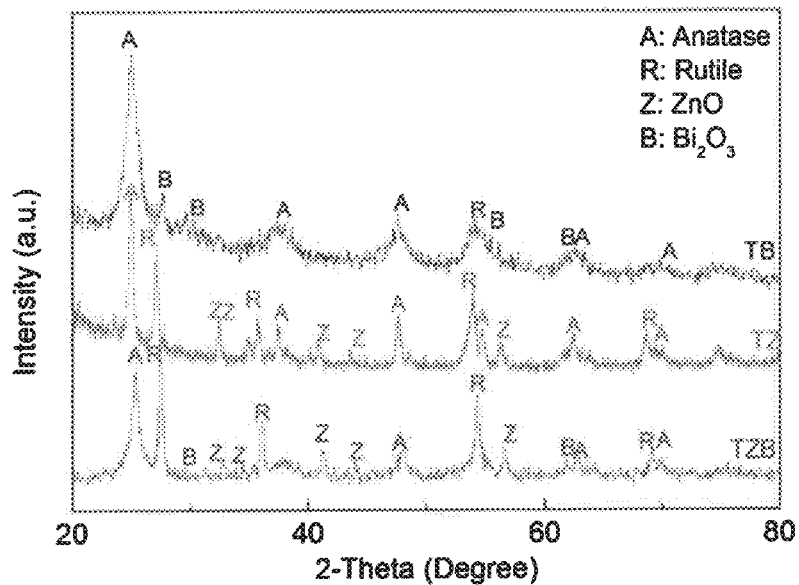
FIG. 6 shows XRD patterns of $TiO_2$/ZnO (TZ) nanofibers, $TiO_2$/$Bi_2O_3$ (TB) nanofibers and TZB nanofibers prepared by the same method.

With reference to FIG. 6, it shows XRD patterns of $TiO_2$/ZnO (TZ) nanofibers, $TiO_2$/$Bi_2O_3$ (TB) nanofibers and TZB nanofibers prepared by the same method. The peaks corresponding to anatase, rutile, ZnO and $Bi_2O_3$ are identified according to the diffraction angles. The UV-Vis absorption spectra of TZ, TB and TZB nanofibers are shown in FIG. 3a and the corresponding UV-Vis diffuse reflectance spectra are provided in FIG. 3b. The band gap energies of the three nanofibers are determined to be 2.96, 2.62 and 2.51 eV, respectively. Due to the synergistic effect resulted from the band position alignment, the band gap energies of TZ nanofibers and TB nanofibers are reduced. Nevertheless, TZB nanofibers have the lowest band gap energy because TZB nanofibers have the largest amount of heterojunctions. The heterojunctions between the nanocrystallines establish a highway for efficient charge transportation.

Figure 7:
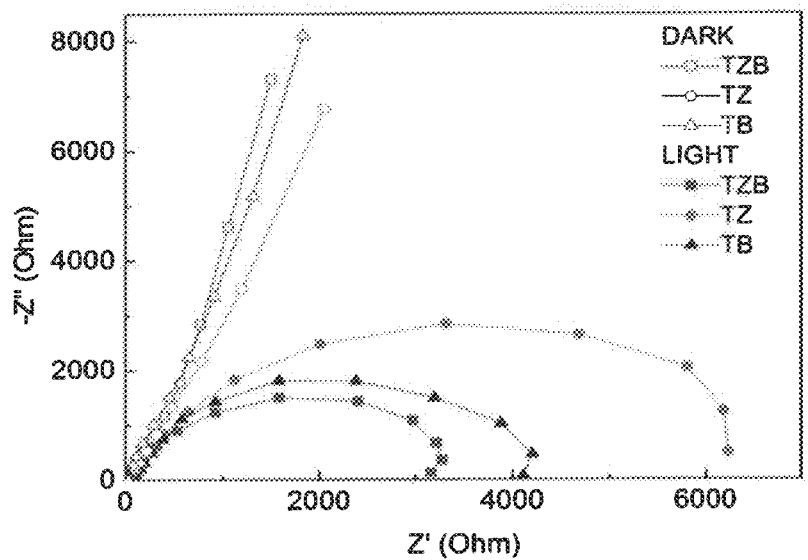
FIG. 7 shows Electrochemical Impedance Spectra (EIS) of TZ, TB and TZB nanofibers.

FIG. 7 shows the EIS results of the TZ, TB and TZB nanofibers. Under a dark condition, electrons transfer from conductive substrates (e.g. fluorine-doped tin oxide glass) to the photocatalyst having nanofibers, and then diffuse through the photocatalyst to the counter-electrode. During the process of transmission, the electrons recombine in the electrolyte. The recombination process is the primary reaction at the interface under "dark condition", which is detrimental for the photocatalytic process, thus it would be highly desirable to have high impedance under dark condition. Referring to the results in FIG. 7, TB and TZ nanofibers are found to have lower impedances in dark condition and higher resistances under illumination. This result reflects that more recombination have been taken place in the TB and TZ nanofibers and lead to a weaker charge transport efficiency when compared with that of TZB nanofibers.

In one embodiment, the composite $TiO_2/ZnO/Bi_2O_3$ nanofibers comprise $Bi_2O_3$ with a concentration of around 0.1% to 1%, ZnO with a concentration of around 0.1% to 1%, and $TiO_2$ with a concentration of around 1% to 10% in a precursor solution when preparing the composite nanofibers. Preferably, the TZB nanofibers comprise 0.1% to 0.4% of $Bi_2O_3$. Most preferably, the TZB nanofibers comprise 0.2% of $Bi_2O_3$. It is because when the Bi concentration is at 0.1% and 0.2%, the fibers appear smooth and even. For higher Bi concentration up to 0.3% and 0.4%, some branch-like nanofibers are formed, which is due to the difference in the coefficients of thermal expansion among these three different semiconductors. The coefficients of thermal expansion of the $TiO_2$, ZnO and $Bi_2O_3$ are $9\times10^{-6}$ $K^{-1}$, $4.75\times10^{-6}$ $K^{-1}$, and $18\times10^{-6}$ $K^{-1}$ respectively. Under a higher bismuth concentration, the composite nanofibers are easily broken up into short rods because of drastic thermal shock and shrinkage taking place in the initial stage.

A UV-Vis diffuse reflectance spectra measurement was conducted to measure the impedance of the TZB nanofibers having different $Bi_2O_3$ concentrations. The $Bi_2O_3$ concentrations are between 0.1% and 0.4%. Using the Kubelka-Munk equation, the band gap of TZB nanofibers with Bi concentration 0.1%, 0.2%, 0.3% and 0.4% together with $TiO_2$ nanoparticles are determined to be 2.74 eV, 2.51 eV 2.81 eV, 2.85 eV and 3.12 eV, respectively. The decrease in band-gap energy of TZB nanofibers as compared to $TiO_2$ nanoparticles can be attributed to the synergistic effect among anatase, rutile, ZnO, and $Bi_2O_3$. As mentioned before, when the $Bi_2O_3$ concentration increases, the TZB nanofibers are more susceptible to breakage during the annealing process and form short nanorods instead. Therefore, the impedance drops when the $Bi_2O_3$ exceeds 0.2%. When the $Bi_2O_3$ concentration is 0.2%, the nanofibers hold the maximum heterojunctions for charge transmission. Therefore, the band gap energy is much lowered at 0.2%.

In one embodiment of the present invention, the photocatalyst is capable for removing a contaminant in a stream of gas or liquid, wherein the contaminant comprises a pollutant. The pollutant comprises any substance that possesses undesired effect when being introduced into an environment. It may cause adverse health effects on animals and plants. Examples of pollutant include nitrogen oxide, volatile organic compounds pollutants and organic dyes.

Figure 8:
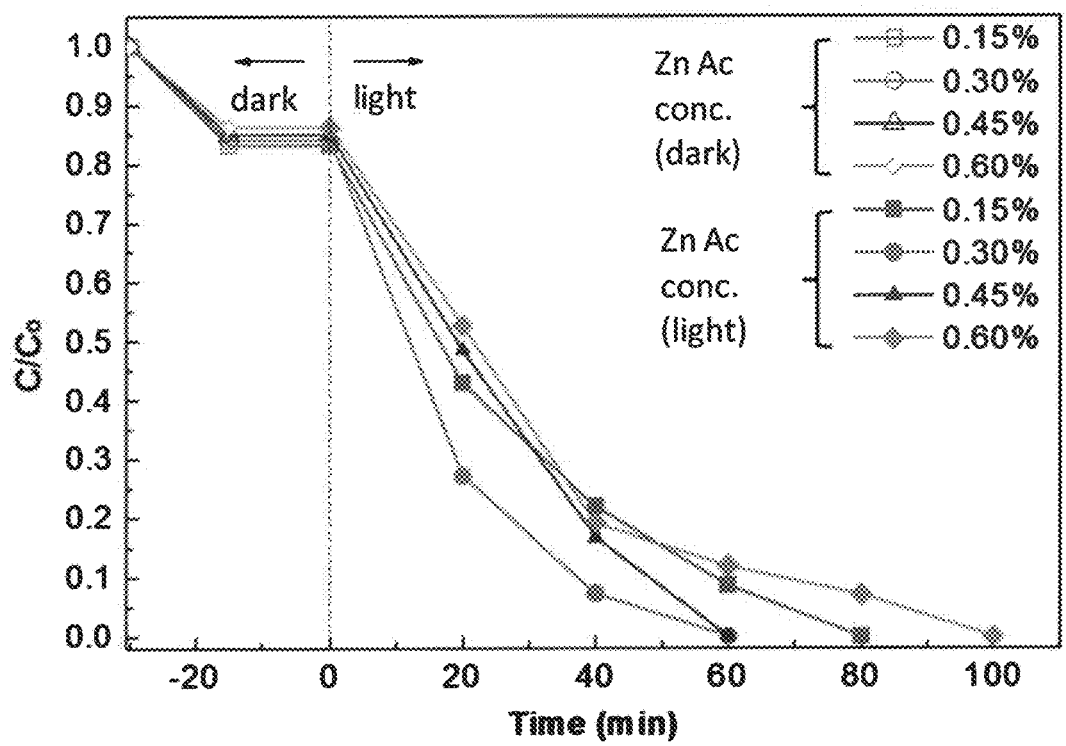
FIG. 8 shows adsorption and photodegradation of Rodamine B (RhB) ($10^{-6}$ M) with various zinc acetate (ZnAc) dopant $TiO_2$ nanofibers in suspension (0.5 g $L^{-1}$).
Figure 9:
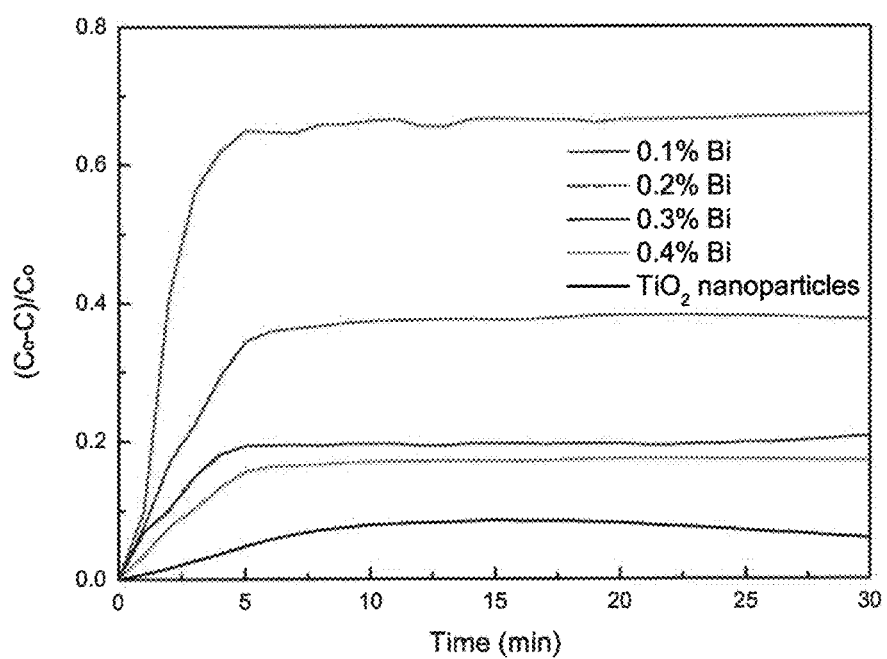
FIG. 9 shows the relative variations of nitrogen oxide (NO) concentration against irradiation time in the presence of TZB nanofibers prepared form different Bi concentrations, and commercial nanoparticles $TiO_2$ (P25).
Figure 10:
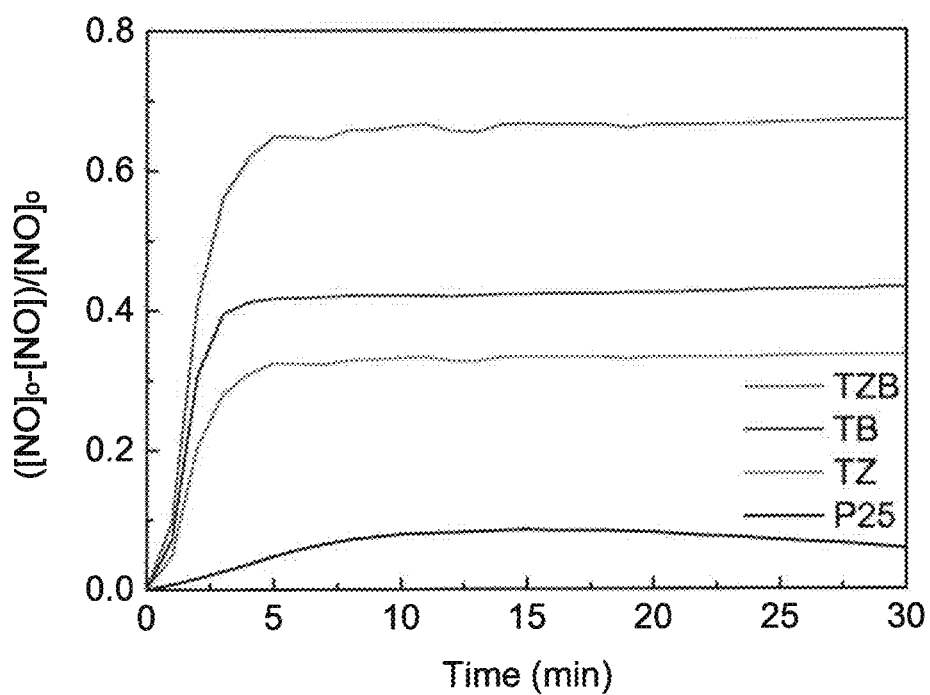
FIG. 10 shows the relative variations of nitrogen oxide (NO) concentration against irradiation time in the presence of TZ, TB and TZB nanofibers and commercial nanoparticles $TiO_2$ (P25).
Figure 11:
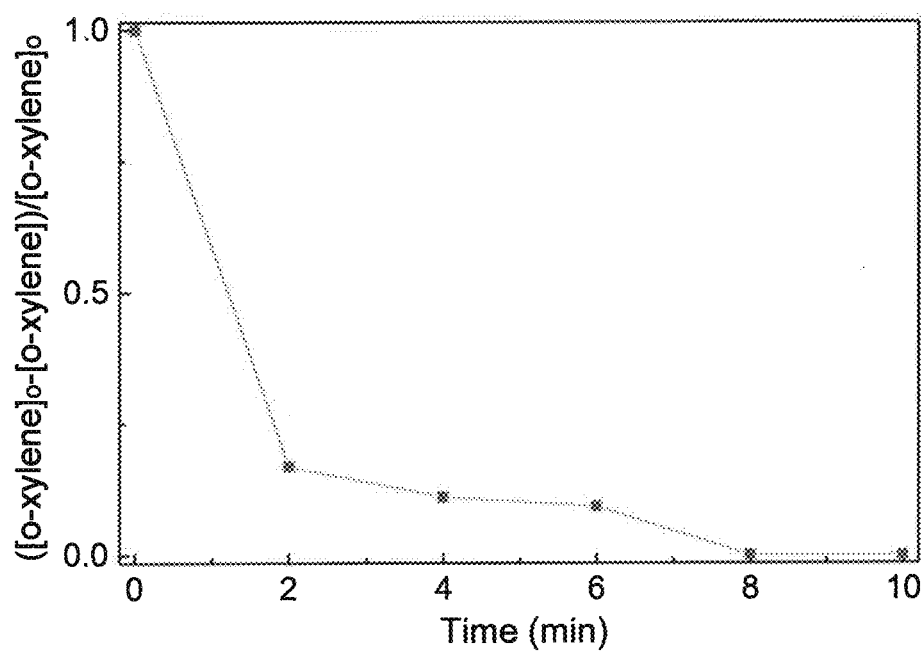
FIG. 11 shows the relative variations of o-xylene concentration against irradiation time in the presence of TZB nanofibers.
Figure 12:
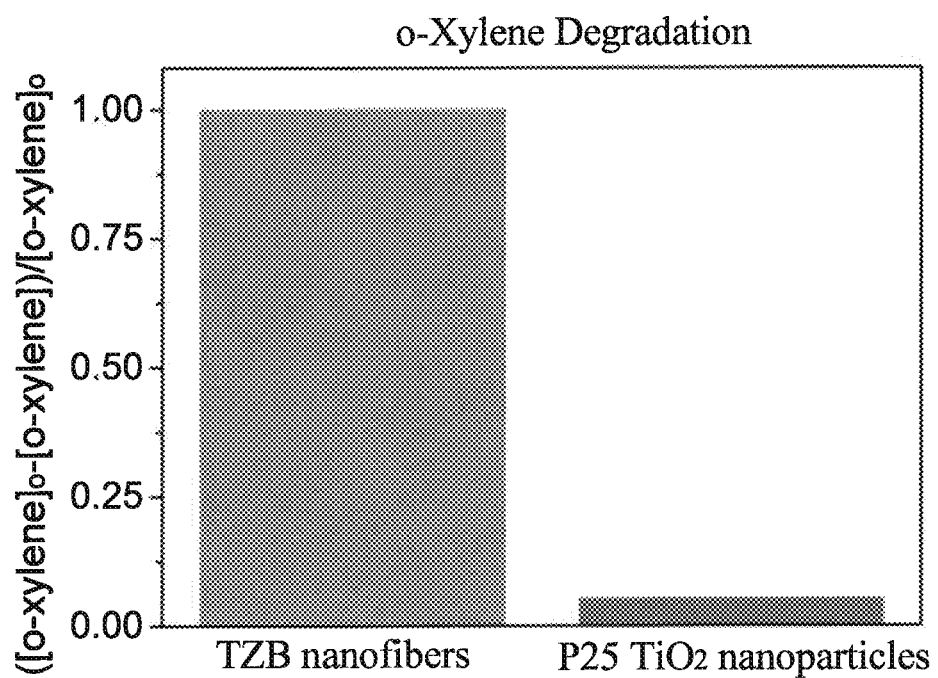
FIG. 12 shows a benchmark test between TZB nanofibers and commercial nanoparticles $TiO_2$ (P25) with 10 min illumination.

With reference to FIGS. 8 to 12, the composite nanofibers of the present invention are found to possess prominent photocatalytic activities under solar irradiation on respectively, Rodamine B (RhB) in water, nitrogen oxide (NO) in air, and volatile organic compounds pollutants (VOC) in air. When compared with commercial $TiO_2$ nanoparticles (about 100 nm) with similar specific surface areas, as shown in FIGS. 10 and 12, the photocatalytic degradation of TZB nanofibers on NO and VOC is significantly improved. For FIG. 8, comparison is made for $TiO_2/Zn$ composite nanofibers with different ZnAc concentrations, for which the composite nanofibers again show superior performance. In all these comparisons, the superior performance owes to the internal structures of the composite nanofibers and the lower band-gap energy. Even if the TZB nanofibers is compared with either the TZ or TB nanofibers, the TZB nanofibers still have a significant improvement in converting pollutants such as NO into harmless substances.

Referring to FIGS. 11 and 12, o-xylene was chosen as a representative volatile organic compounds (VOCs) pollutant to investigate the photocatalytic degradation process by respectively TZB nanofibers and $TiO_2$ nanoparticles (P25) under full spectrum illumination. The amount of photocatalysts used in each test is 50 mg. For 10 min illumination, the removal of o-xylene by commercial $TiO_2$ nanoparticles is very low (5.25%). In contrast, the removal by TZB nanofibers is up to 100%, as shown in FIG. 12.

In another embodiment, the photocatalyst of the present invention further comprises a polymer for increasing the elasticity of the composite fiber. This is advantageous in that the durability of the photocatalyst would be improved. Preferably, the polymer is porous and permeable to allow light to penetrate through the polymer and interact with the composite fibers therein. Preferably, the polymer also allows gases from the environment to permeate freely through the polymer to reach the photocatalyst, and vice versa.

One of the methods for preparing a polymer coated photocatalyst of the present invention is: electrospinning an inorganic composite fiber solution with a polymer solution having different viscosities; forming inorganic fibers inside the polymer fibers; and calcinating the polymer fibers so as to make the polymer fibers porous for light penetration. Another method is directly coating a fabricated composite fiber through chemical or physical process, such as chemical vapor evaporation, to be followed by a post-calcination to make the polymer fiber porous.

In a further embodiment, the photocatalyst of the present invention further comprises a substrate for holding the composite fibers firmly. Inorganic nanofiber is very brittle and easily broken. To better hold the nanofiber in place without significantly affecting the photocatalytic performance, a substrate having a network structure can be adopted to provide support for the nanofibers and house them firmly by trapping them inside the network structure. Preferably, the network structure comprises porosity such that it allows light to penetrate through the substrate and interact with the composite nanofibers for photocatalytic activities. Also, gases can freely permeate through the substrate between the composite fibers and the environment. In other words, the substrate provides a certain degree of light transparency and gas permeability for photocatalytic activities.

The material of the substrate, diameter of the nanofibers, the total depth of the substrate h, and the basis weight of nanofibers in g/m² (gsm) can be adjusted to optimize the process. The basis weight does not need to be uniform across the entire substrate layer, it can be arranged so that there are fewer fibers (loosely packed or lower packing density) on the surface allowing more light to penetrate through the macro-pores formed and, perhaps, more fibers towards the bottom (densely packed or higher packing density) for reflecting or trapping light. This effect could also have been obtained with small diameter nanofibers near the surface and larger diameter nanofibers towards the bottom.

Figure 13A:
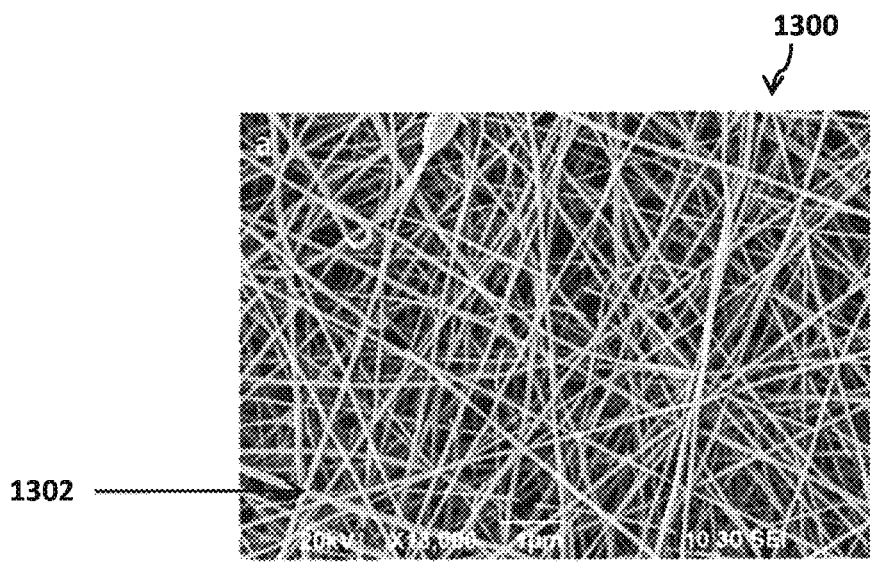
FIG. 13a shows a SEM of nylon fibers with an average diameter of around 94 nm.
Figure 13B:
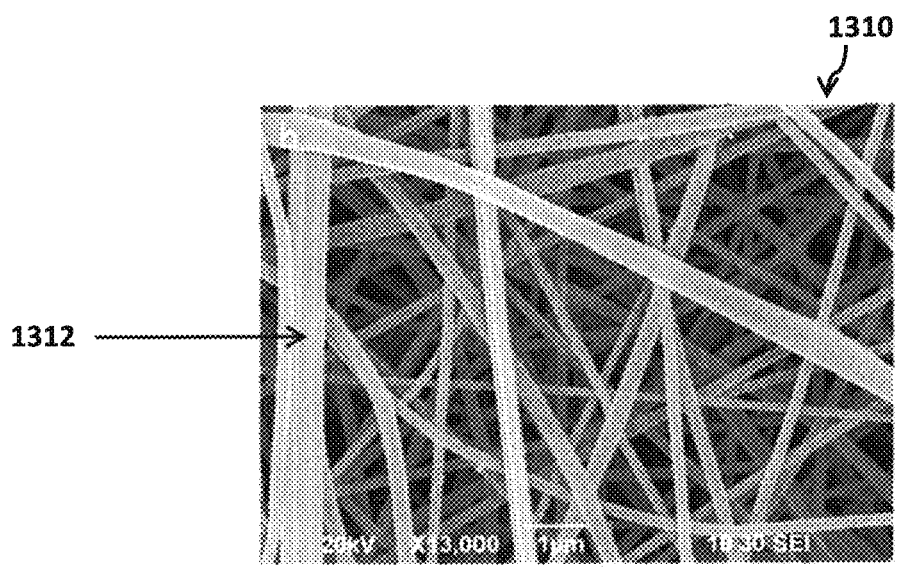
FIG. 13b shows a SEM of nylon fibers with an average diameter of around 220 nm.

In one embodiment, the substrate may consist of polymer, inorganic fibers or cellulose. Preferably, polymeric fibers such as nylon fibers are utilized to form the network structure of the substrate. Nylon is a suitable material for the substrate because it is insoluble in water and is inert to solar irradiation. FIGS. 13a and 13b show SEM images, respectively, of the substrate 1300, 1310 consisting of a network of nylon nanofibers 1302, 1312 having an average fiber diameter ranging from 90 nm to 220 nm. Such a network with nanostructure is capable for trapping and adhering the composite nanofibers, truncated nanofibers or nanorods firmly. A person skilled in the art will understand that the diameter of the nylon fiber can be adjusted in accordance with the diameter of the composite fiber to suit the practical need.

FIGS. 14a, 14b, 14c, 14d, and 14e illustrate how a substrate holds the composite fibers in place by using a network of polymeric fibers. In this example, TZB nanofibers are chopped to smaller pieces through sonication for about 15 min to 1 h. The truncated nanofibers, or nanorods, are then suspended in ethanol with well mixing. Ethanol is used because of its favorable wetting characteristic which can penetrate through the pores of nylon readily. Alternatively, other solution having a good wetting characteristic can also be applied. After the mixing, the truncated nanofibers, or nanorods, can be introduced into the substrate via spraying, dip coating, deep casting, or any common physical processes. A person skilled in the art will understand that any common methods that can introduce the nanofibers into the substrate can be used.

In this example, methods such as spraying, dip coating and deep casting have been studied to prepare a substrate with uniformly distributed and highly packed truncated nanofibers. These methods are briefly described below:

(a) Spraying: preparing a suspension of truncated composite nanofibers, transferring the suspension into a reservoir of a spray device (the spray device is associated with a pressurized nitrogen gas); and spraying the suspension uniformly onto a nylon substrate.

(b) Dip coating: immersing the nylon substrate into a suspension containing the truncated composite nanofibers at a constant speed; allowing the substrate to stay in the suspension for a while such that the truncated composite nanofibers adhere onto the substrate network; and finally pulling up the nylon substrate with the truncated nanofibers being trapped/deposited in the substrate. Excess liquid will drain off from the surface. By evaporating the solvent, a thin layer of nanofiber mat is formed in the substrate. For dip coating, it is important to avoid trapping air in the substrate when immersing the substrate into the suspension of truncated composite fibers. If air is trapped inside the substrate, the air bubbles formed will block the pores of the substrate and reduce the efficiency of trapping and adhering truncated composite fibers in the substrate. It will also lead to a non-uniform distribution of the truncated composite fibers in the substrate. Therefore, it is necessary to immerse the nanofibers carefully at constant speed to purge air out of the substrate.

(c) Deep Casting: using a dropper to drip the suspension onto the substrate such that the suspension will enter the macro-pores of the substrate; and drying the substrate. Alternatively, a multi-dropper arrangement, with possible automation, can be used for a substrate having a large area so as to provide uniformity of the composite fibers. Preferably, the above steps can be repeated to assure a high packing density of the composite fibers in the substrate. In other words, the amount of composite fibers loaded on the substrate is adjustable and can be readily control by a user according to individual practice.

Figure 14A:
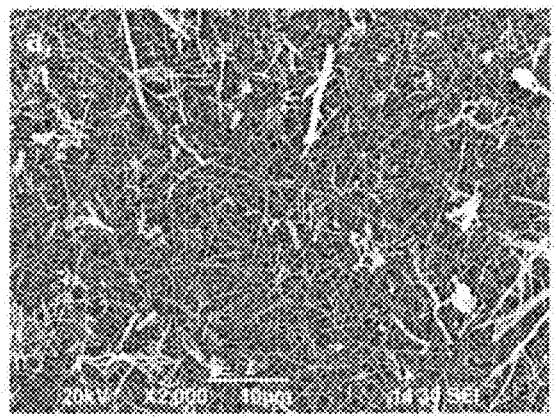
FIGS. 14a, 14b, 14c, 14d, and 14f show a SEM of the nylon substrate prepared with truncated TBZ nanofibers.
Figure 14D:
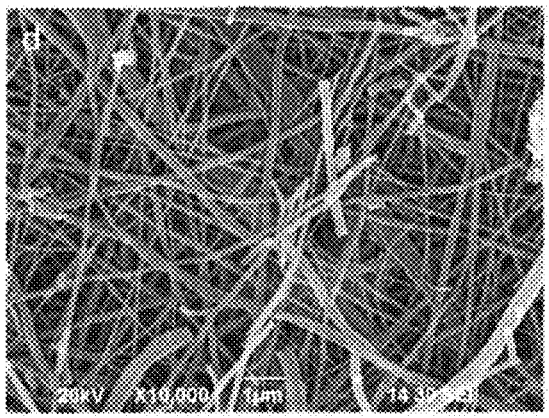
Figure 14B:
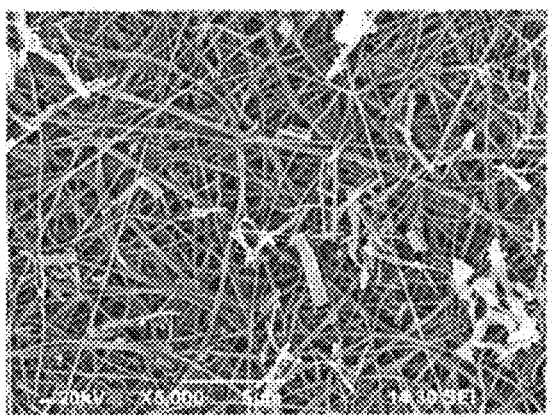
Figure 14E:
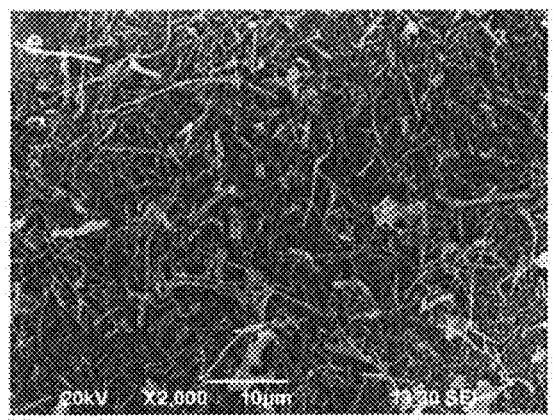
Figure 14C:
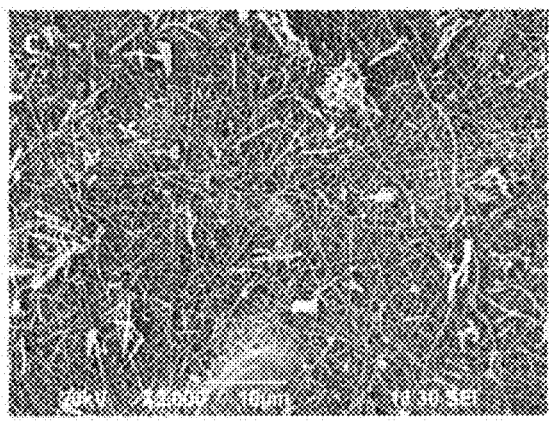
Figure 14F:
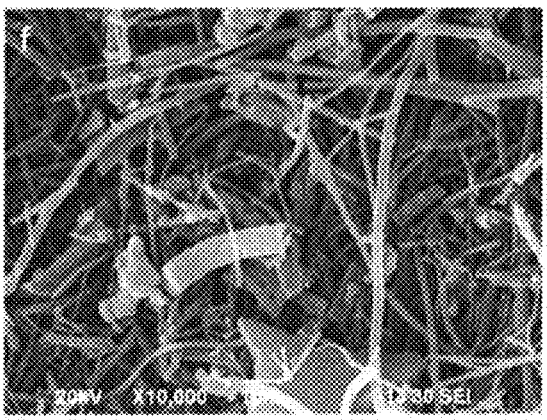

FIGS. 14a, 14b, 14c, 14d, 14e, and 14f show that all of the above methods can prepare a photocatalyst having a substrate loaded uniformly with truncated nanofibers. FIG. 14a is an SEM of the nylon substrate prepared with truncated TBZ nanofibers by spraying and FIG. 14d is a close-up of FIG. 14a. FIG. 14b is an SEM of the nylon substrate prepared with truncated TBZ nanofibers by dip coating and FIG. 14e is a close-up of FIG. 14b. FIG. 14c is an SEM of the nylon substrate prepared with truncated TBZ nanofibers by deep casting and FIG. 14f is a close-up of FIG. 14c. This is particular advantageous in that the use of the substrate allows the photocatalyst to be mounted on various devices or infrastructures. Specifically, the photocatalyst substrate can be applied on a flexible surface, such as a face mask to remove pollutant when breathing, or wearable apparel, for removing harmful gases before they contact with the body. Also, the quantity of composite fibers carried by the substrate is controllable; for example, by simply repeating the preparation procedure or adjusting the concentration of the suspension of the composite fibers. Accordingly, the use of substrate allows the photocatalyst to be applied in a wide range of applications without significantly affecting the photocatalytic performance of the composite fibers.

Figure 15:
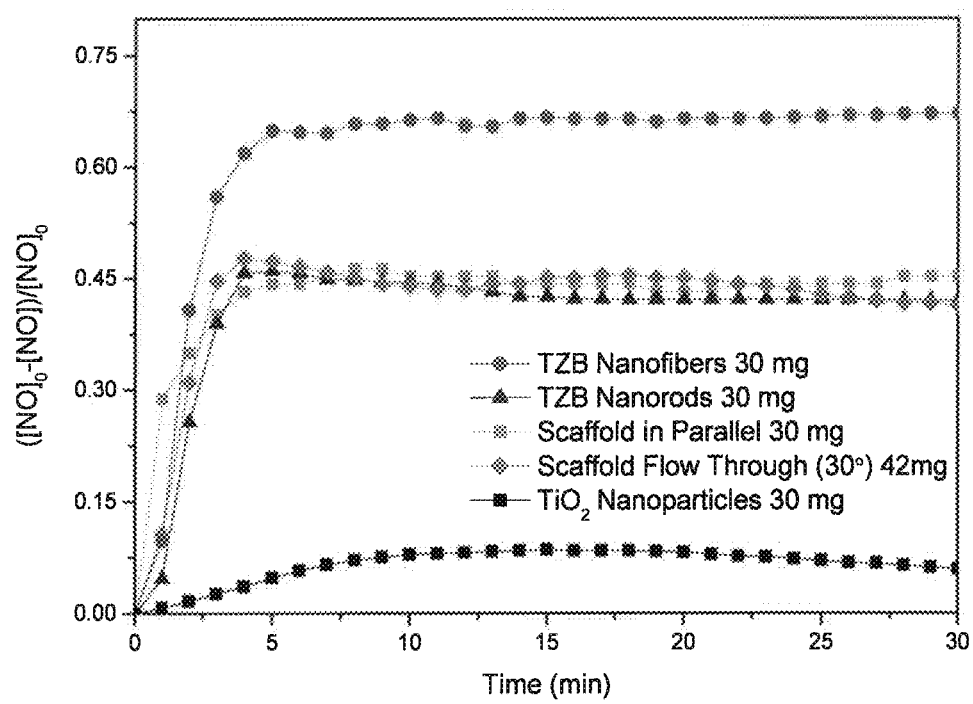
FIG. 15 shows the relative variations in nitrogen oxide concentration against irradiation time in the presence of TZB nanofibers, TZB nanorods, $TiO_2$ nanoparticles, and the substrate loaded with TZB nanofibers.

With reference to FIG. 15, the photocatalytic performance of a photocatalyst having a substrate loaded with composite fibers has been tested on the removal of NO. In this example, the nylon substrate carrying 30 mg of TZB nanorods has been investigated, and the results obtained are compared with that of 30 mg of TZB nanofibers alone (without substrate) and TZB nanorods alone (without substrate). The results show that the photocatalyst of TZB nanorods alone without substrate achieves a lower NO removal activity when compared with the photocatalyst of TZB nanofibers without substrate. This is mainly due to the fact that the TZB nanorods have lower charge transportation efficiency as compared to the nanofibers.

However, the photocatalyst having a substrate with TZB nanorods can perform substantially equal photocatalytic activities as that of TZB nanorods without substrate. In other words, the results confirm that the use of the substrate, or carrier, does not significantly affect the photocatalytic performance of the composite fibers in the substrate. This is advantageous in that the substrate of the present invention enables the production of large-scale photocatalyst for various applications. The photocatalyst can be produced in a sheet extending up to meters in length. In one example, the photocatalyst can be manufactured as a filter mounted on a cleaning device to purify air in an air channel, or remove pollutants in a liquid flowing through a pipe.

In one embodiment of the present invention, the photocatalyst is preferably arranged substantially tangentially with respect to the direction of the stream of gas or liquid to ensure a high photocatalytic activity for removing contaminant in the stream.

Figure 16A:
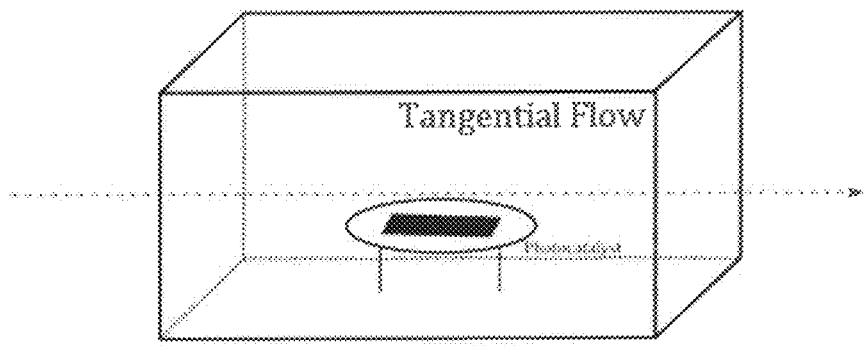
FIGS. 16a, 16b, and 16c illustrate the possible arrangements of the photocatalyst with respect to a stream of gas or liquid.
Figure 16B:
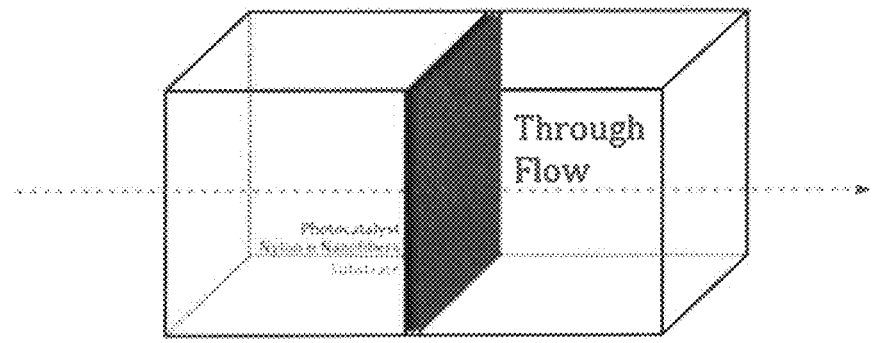
Figure 16C:
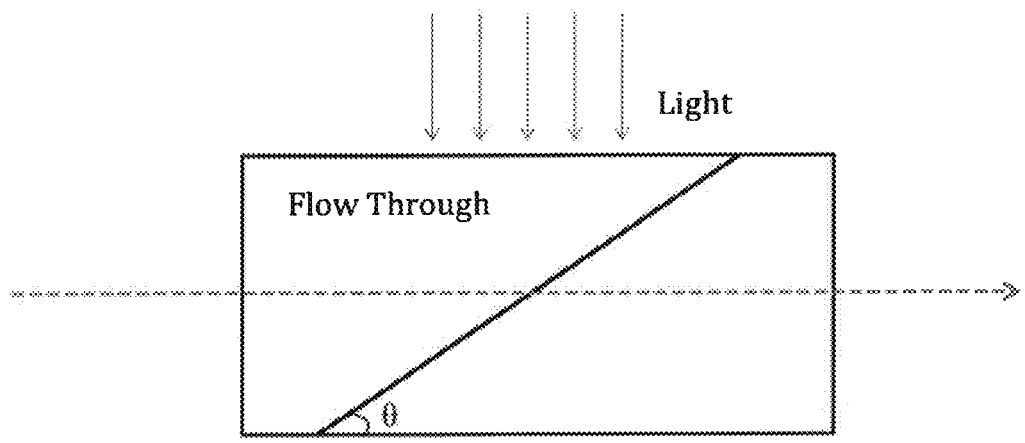
Figure 17:
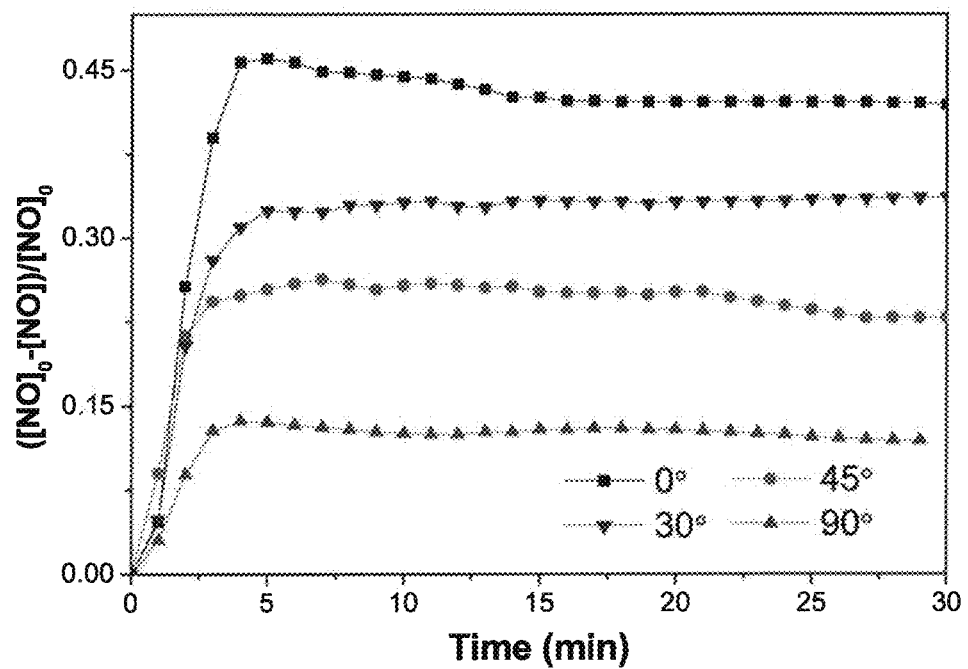
FIG. 17 shows through flow tests results of the relative variations in nitrogen oxide concentration against irradiation time in the presence of a photocatalyst having a substrate loaded with TZB nanofibers, wherein the photocatalyst was positioned at different angles with respect to the tangential flow.

To further investigate the efficiency of the photocatalyst (with a substrate which may also be called a scaffold) having different orientations with respect to the gas stream or liquid stream, tangential flow tests, and through-flow tests have been conducted. Referring to FIGS. 16a, 16b, and 16c, the photocatalyst having a substrate loaded with composite TZB truncated nanofibers was positioned tangentially as in FIG. 16a, perpendicularly, as in FIG. 16b, or at an angle, as in FIG. 16c, with respect to the flow in a channel. Note the light irradiates the channel through a transparent window in a direction perpendicular to the flow (refer to FIG. 16c). With reference to the results in FIG. 15, it is found that the photocatalyst (with a substrate) being placed tangentially achieves an equal performance with that achieved by a photocatalyst having loose composite nanorods. The photocatalyst (with a substrate) being placed perpendicularly can only achieve a comparable efficiency when the loaded amount of composite fibers is increased. With reference to FIG. 17, it shows that when the angle with respect to the flow direction increases (from 0 to 90°), the NO removal efficiency decreases. One possible reason may be that less composite nanofibers are irradiated by the light when the angle increases from the horizontal orientation. Nevertheless, the reduction of NO removal efficiency can be compensated by increasing the amount of composite truncated nanofibers in the substrate.

In another aspect of the present invention, there is provided a device and a method for removing contaminant from a stream of gas or liquid, comprising a photocatalyst of the present invention.

In one embodiment, the photocatalyst of the present invention may be provided in a device for purifying the gas stream, or liquid stream, which passes through the device. The photocatalyst is positioned adjacent to the stream so as to interact with water vapor in the stream for photocatalytic activities. By further providing a light source or making use of solar light, the photocatalyst will then be activated to generate radicals, such as oxygen and hydroxyl radicals, to convert contaminants in the stream into harmless substances for discharge. This is advantageous in that the photocatalyst can be applied in medical devices, infrastructures, vehicles, pipes, buildings, and appliances etc. for cleaning air or liquid. In an alternative embodiment, the photocatalyst can be used as a filter to trap particles present in the stream with the network structure of the substrate.

Figure 18A:
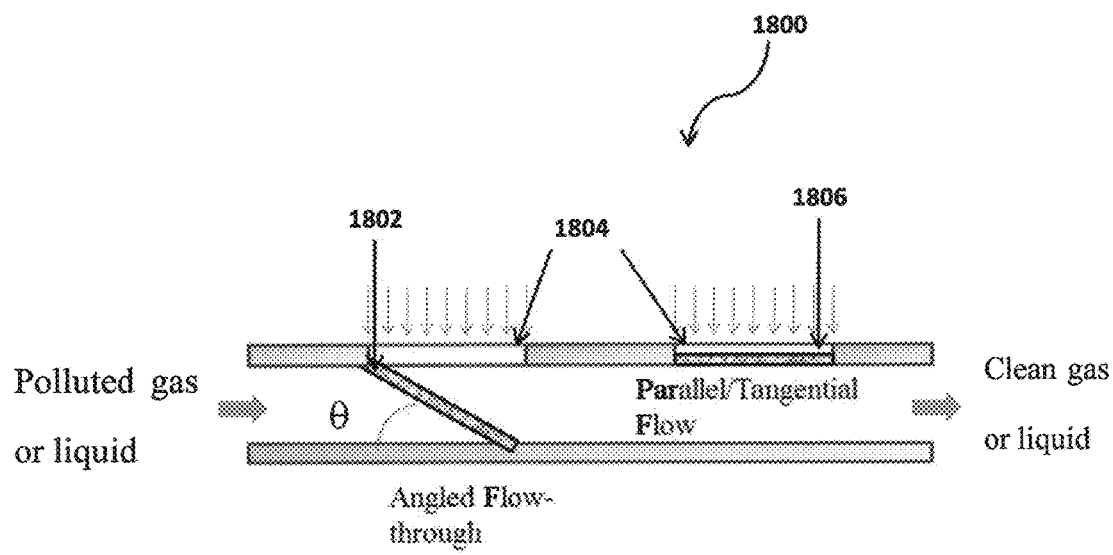
FIG. 18a illustrates two possible arrangements of the photocatalyst of the present invention in a device whereby in one arrangement the photocatalyst is at an angle to the channel wall allowing for through flow, and another arrangement with the photocatalyst arranged parallel to the channel wall allowing only a tangential flow.

FIG. 18a illustrates one example of the photocatalyst associated with a device 1800. As shown, a first photocatalyst 1802 may be provided at an angle with respect to the direction of the flow such that the stream of gas or liquid flows through the photocatalyst 1802 from an upstream end to a downstream end of the photocatalyst 1802. Under light irradiation through the transparent window 1804, this photocatalyst 1802 generates radicals for photocatalytic activity and at the same time traps particles when the polluted gas or liquid passes through it. Preferably, a second photocatalyst 1806 may be mounted at the downstream of the first photocatalyst 1802 and positioned substantially tangentially with respect to the direction of the flow. The second photocatalyst 1806 ensures that most of targeted contaminants in the stream are removed before discharging from the device 1800. Such a two-stage photocatalytic process ensures that the stream is substantially free of contaminates for discharging.

Figure 18B:
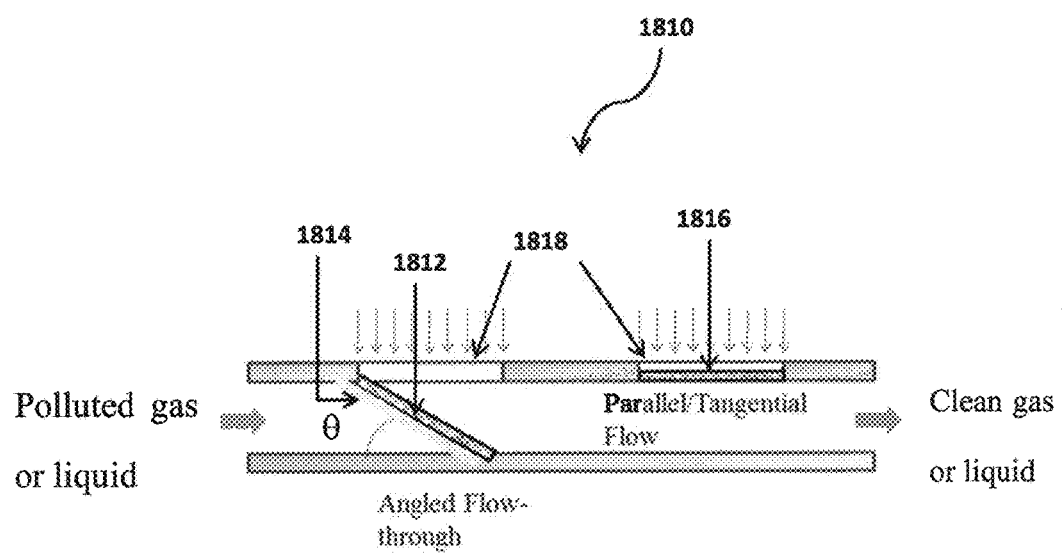
FIG. 18b illustrates an example of a combined use of an upstream filter and a downstream photocatalyst in a device set at an angle with respect to the channel wall.

In another example, there is provided a combination of a photocatalyst of the present invention and a filter in a device. The device may adopt a single-stage photocatalytic process, with either horizontal or angled arrangement. FIG. 18b illustrates an example of a device 1810 having a photocatalyst 1812 combined with a filter 1814. The photocatalyst 1812 is arranged with an angled orientation with respect to the horizontal direction of the flow. The filter 1814 is provided upstream of the photocatalyst 1812 for removing suspended particles and followed immediately by the photocatalyst 1812 for removing or converting harmful substances in the gas or liquid. The angular orientation allows the filter and the photocatalyst to enhance the filtration efficiency and photocatalytic activities when the stream of gas or liquid flows from an upstream end of the filter and the photocatalyst to a downstream end of the filter and photocatalyst. Optionally, additional photocatalyst 1816 may also be provided downstream of the photocatalyst 1812 to make sure that the stream is substantially free of contaminants for discharging.

There are two advantages with this filter-purifier serial arrangement as shown in FIG. 18b. Given the filter 1814 is located upstream of the photocatalyst 1812 in a device, most suspended particles are removed before entering the photocatalyst 1812. Accordingly, this arrangement reduces clogging of the photocatalyst downstream by particles, thereby increasing the longevity of the photocatalyst. Furthermore, in the absence of the filter 1814, some fine particles may flow through the photocatalyst 1812. Those fine particles may scatter the light shining through the transparent window 1818, thereby reducing the light intensity irradiated on the photocatalyst 1812, and consequently decreasing the photocatalytic performance of the photocatalyst 1812. This is therefore advantageous to include a filter 1814 upstream of the photocatalyst 1812 to maintain a high and constant photocatalytic efficiency of the photocatalyst.

For gas applications, the filter 1814 may be made up of microfibers 1 micron to 30 microns in average fiber diameter. The filter 1814 may also be made up of nanofibers with average diameter 50 nm to 1000 nm similar to FIG. 13a and FIG. 13b. It may also be made up of a combination of microfibers and nanofibers. Alternatively, for liquid applications, the filter 1814 may be made of any conventional filtering materials suitable for removing particles in a liquid, such as foam and membrane.

The inclined angle $\theta$ from the horizontal for the combined arrangement of the filter 1814 and photocatalyst 1812 in FIG. 18b, may be any angle between 0° and 90°. Preferably, the inclined angle is between 10° and 40°. More preferably, the inclined angle is about 20° to 30°. It is because the smaller the angle, e.g. below 15°, the larger the photocatalyst is required to extend across the channel. Considering both practical design and performance of the photocatalyst, the inclined angle is most preferred to be 20° to 30°. As such, the combined arrangement of the filter and photocatalyst at an angle with respect to the horizontal can attain a high filtration efficiency and high photocatalytic efficiency.

In a further embodiment, the photocatalyst of the present invention may have a pleated configuration. Preferably, it may be arranged with a V-shape or a zigzag configuration. The photocatalyst with a substrate of the present invention does not need to be of planar geometry as shown in FIG. 18a and FIG. 18b. The substrate of the photocatalyst may be pleated with V-shape or zigzag configuration 1901 as shown in FIGS. 19a, 19b to increase the surface area for photocatalytic reaction and reduce the challenging face velocity on the photocatalyst.

Figure 19A:
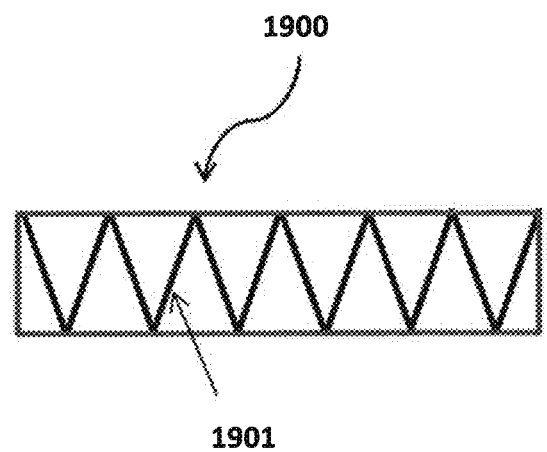
FIGS. 19a and 19b illustrate examples of possible arrangement of a pleated photocatalyst.
Figure 19B:
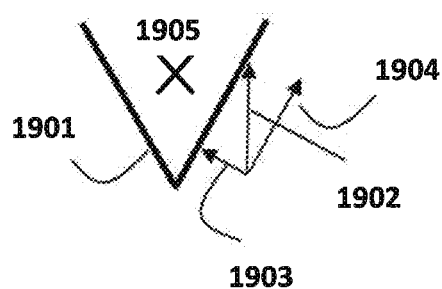

With reference to FIG. 19b, the pleated geometry of the photocatalyst allows the original face velocity 1902 to be resolved into two components. The two components are, respectively, an effective face velocity 1903 perpendicular to the surface of the photocatalyst 1901, and a velocity component 1904 tangential to the surface of the photocatalyst 1901. The magnitude of the face velocity 1903 is much smaller than that of the original velocity 1902. This is advantageous in that the photocatalyst 1901 can attain a higher photocatalytic performance with a maximal contact between the stream of gas or liquid and the photocatalyst surface.

In one example of the present invention, a filter that combined with the pleated photocatalyst may also be pleated to conform to the geometry of the photocatalyst, thereby increasing the surface area of the filter and reducing the face velocity. Accordingly, both filter and photocatalyst are of pleated geometry for attaining higher filtration (particle removal) and purification (harmful gas or liquid removal) performance.

If the photocatalyst 1802 as shown in FIG. 18a is pleated to have a V-shaped shape or a zigzag configuration shown in FIGS. 19a and 19b, a groove 1905 of the photocatalyst is provided to be substantially aligned with the flow direction of the stream (i.e. the stream of gas or liquid flows into the paper). The groove avoids blockage of the stream flow and maximizes the contact between the stream (carrying the contaminants) and the photocatalyst surface. Preferably, the photocatalyst having the pleated configuration protrudes into the stream of gas or liquid from the internal wall of the channel (not shown) into the flow stream of air or liquid to maximize the contact with the contaminant in the flow stream so as to increase the photocatalytic activity.

Figure 20:
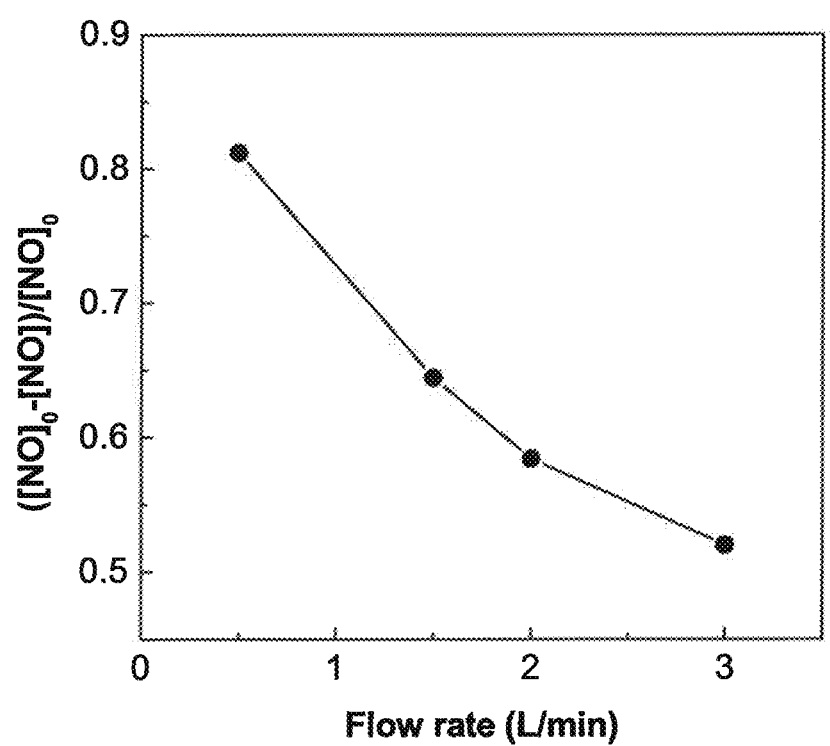
FIG. 20 shows the NO removal by TZ nanofibers for different flow rates.

The flow rate of the stream of gas or liquid also affects the photocatalytic performance in a certain extent. FIG. 20 shows the NO removal by TZ nanofibers for different flow rates. Given the area is constant, this result can be interpreted as photocatalytic performance versus the face velocity. It can be seen that NO removal increases with decreasing flow velocity. The lower is the through flow rate (or through flow velocity) of NO, the longer the contact time between NO and the photogenerated hydroxyl radicals, thus the higher the NO removal efficiency. This supports the above embodiment that pleating the photocatalyst substrate reduces the effective through flow velocity and increases the photocatalytic activity.

In an alternative embodiment, the photocatalyst is disposable such that it allows the user to replace the old unit with a new one. This is particular useful when the photocatalyst is used as a filter because the photocatalyst may be saturated with a significant amount of particles when cleaning the stream. Accordingly, the photocatalyst of the present invention is user-friendly and can be mass-produced with a low cost. Alternatively, a filter may be applied upstream of the photocatalyst as shown in FIG. 18*b* to remove suspended particles in the stream of gas or liquid to increase the longevity of the photocatalyst.

It should be understood that the above only illustrates and describes examples whereby the present invention may be carried out, and that modifications and/or alterations may be made thereto without departing from the spirit of the invention.

It should also be understood that certain features or steps of the invention, which are, for clarity, described in the context of separate embodiments, may also be provided in combination in a single embodiment. Conversely, various features or steps of the invention which are, for brevity, described in the context of a single embodiment, may also be provided or separately or in any suitable subcombination.

The invention claimed is:

1. A photocatalyst comprising a composite fiber including at least three n-type crystalline semiconductor materials, wherein
the n-type crystalline semiconductor materials form a heterojunction structure in the composite fiber, and
the n-type crystalline semiconductor materials include bismuth oxide, titanium dioxide, and zinc oxide.

2. The photocatalyst of claim 1, wherein the n-type crystalline semiconductor materials have band position alignments which allow vectorial displacement of electrons and holes.

3. The photocatalyst of claim 1, wherein the composite fiber includes a p-type semiconductor material selected from the group consisting of copper (I) oxide, copper (II) oxide, cadmium telluride, and combinations thereof.

4. The photocatalyst of claim 1, wherein the n-type crystalline semiconductor materials are prepared from a precursor solution including bismuth oxide in a concentration from about 0.1% to about 1%, a precursor solution including zinc oxide in a concentration from about 0.1% to about 1%, and a precursor solution including titanium dioxide in a concentration from about 1% to about 10%.

5. The photocatalyst of claim 1, wherein the composite fiber has a nanostructure.

6. The photocatalyst of claim 1, wherein
the photocatalyst is capable of removing a contaminant from a fluid stream, and
the contaminant comprises a pollutant.

7. The photocatalyst of claim 1, wherein the composite fiber further comprises a polymer coating.

8. The photocatalyst of claim 1, further comprising a substrate holding the composite fiber.

9. The photocatalyst of claim 8, wherein the substrate is transparent to light and is gas permeable.

10. The photocatalyst of claim 8, wherein the substrate is flexible.

11. The photocatalyst of claim 8, wherein the substrate is a network with a nanostructure.

12. The photocatalyst of claim 11, wherein the network structure consists of polymeric fibers.

13. The photocatalyst of claim 12, wherein the polymeric fibers include nylon.

14. The photocatalyst of claim 8, wherein the composite fiber is selected from the group consisting of nanofibers, truncated nanofibers, nanowires, nanorods, and combinations thereof.

15. A photocatalyst comprising a composite fiber including at least two crystalline semiconductor materials, wherein
the at least two crystalline semiconductor materials form a heterojunction structure in the composite fiber, and
one of the at least two crystalline semiconductor materials is prepared from a precursor solution including bismuth oxide in a concentration from about 0.1% to about 1%, a precursor solution including zinc oxide in a concentration from about 0.1% to about 1%, and a precursor solution including titanium dioxide in a concentration from about 1% to about 10%.

16. The photocatalyst of claim 15, wherein one of the crystalline semiconductor materials is a p-type semiconductor material selected from the group consisting of copper (I) oxide, copper (II) oxide, cadmium telluride, and combinations thereof.

17. The photocatalyst of claim 15, wherein the composite fiber further comprises a polymer coating.

18. A photocatalyst comprising a composite fiber including at least two n-type crystalline semiconductor materials, wherein
the at least two n-type crystalline semiconductor materials form a heterojunction structure in the composite fiber,
the at least two n-type crystalline semiconductor materials have band position alignments which allow vectorial displacement of electrons and holes,
one of the at least two n-type semiconductor materials is bismuth oxide, and
the composite fiber includes a p-type semiconductor material selected from the group consisting of copper (I) oxide, copper (II) oxide, cadmium telluride, and combinations thereof.

19. The photocatalyst of claim 18, wherein the at least two n-type crystalline semiconductor materials include titanium dioxide, zinc oxide, and bismuth oxide.

20. The photocatalyst of claim 19, wherein the n-type crystalline semiconductor materials are prepared from a precursor solution including bismuth oxide in a concentration from about 0.1% to about 1%, a precursor solution including zinc oxide in a concentration from about 0.1% to about 1%, and a precursor solution including titanium dioxide in a concentration from about 1% to about 10%.

21. The photocatalyst of claim 18, wherein the composite fiber has a nanostructure.

22. The photocatalyst of claim 18, wherein
   the photocatalyst is capable of removing a contaminant from a fluid stream, and
   the contaminant comprises a pollutant.

23. The photocatalyst of claim 18, wherein the composite fiber further comprises a polymer coating.

24. The photocatalyst of claim 18, further comprising a substrate holding the composite fiber.

25. The photocatalyst of claim 24, wherein the substrate is transparent to light and is gas permeable.

26. The photocatalyst of claim 24, wherein the substrate is flexible.

27. The photocatalyst of claim 24, wherein the substrate is a network with a nanostructure.

28. The photocatalyst of claim 27, wherein the network structure consists of polymeric fibers.

29. The photocatalyst of claim 28, wherein the polymeric fibers include nylon.

\* \* \* \* \*